J. BANNON AND F. W. THOROLD.
METHOD OF RECOVERING FATTY SUBSTANCES.
APPLICATION FILED JUNE 11, 1919.
1,367,652.
Patented Feb. 8, 1921.
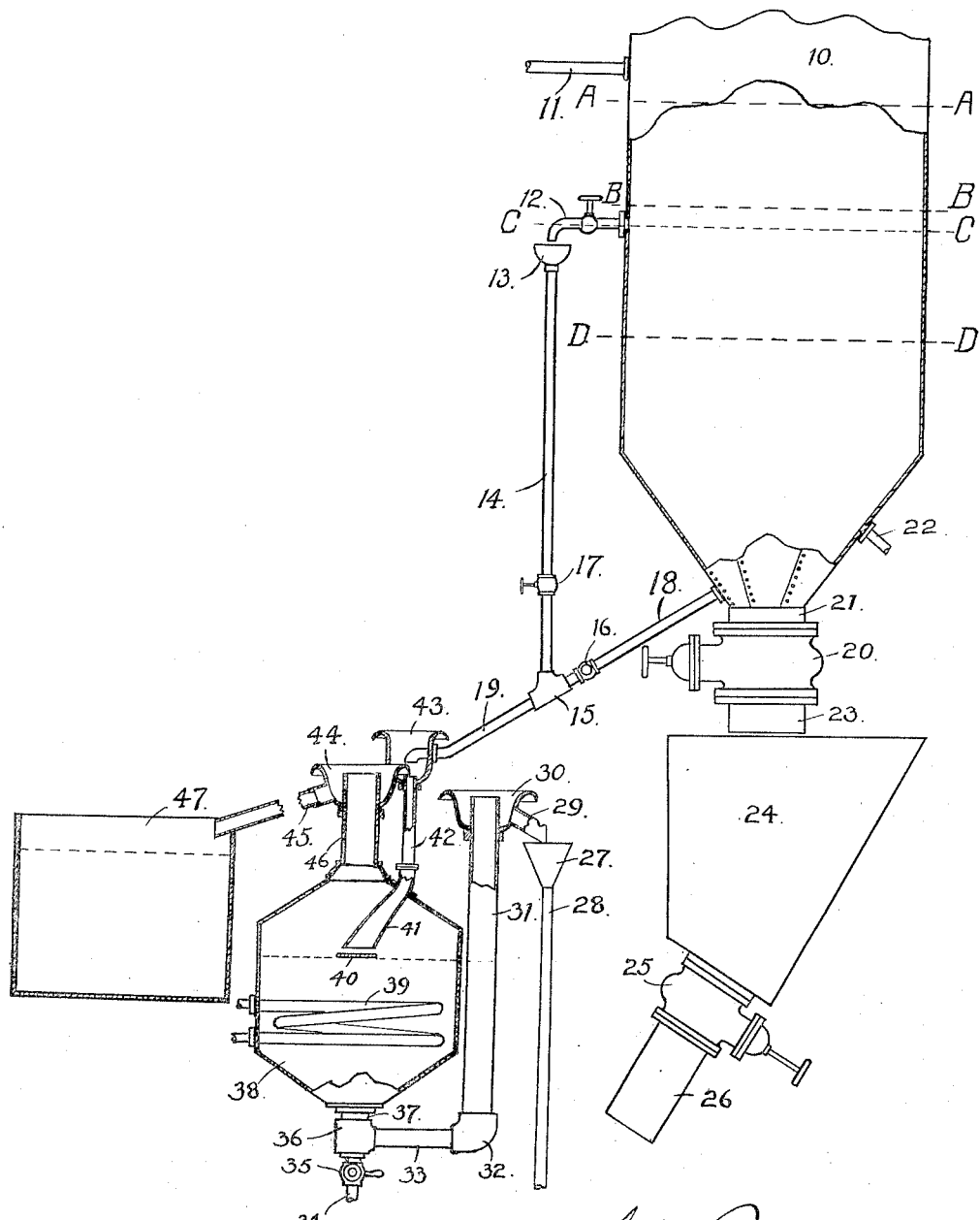
Inventors; John Bannon,
Frederick W. Thorold
By, Wm. J. Hudman.
Attorney.

UNITED STATES PATENT OFFICE.

JOHN BANNON AND FREDERICK W. THOROLD, OF TORONTO, ONTARIO, CANADA.

METHOD OF RECOVERING FATTY SUBSTANCES.

1,367,652.  Specification of Letters Patent.  Patented Feb. 8, 1921.

Application filed June 11, 1919. Serial No. 303,375.

*To all whom it may concern:*

Be it known that we, JOHN BANNON and FREDERICK W. THOROLD, citizens of the Dominion of Canada, and residents of Toronto, county of York, and Province of Ontario, Canada, have jointly invented a new and useful Improvement in Methods of Recovering Fatty Substances, of which the following is a specification.

Our invention relates to methods or processes of recovering fatty substances from water and solid matter, and specifically pertains to that class of such processes which are employed in recovering grease or lard from tank water and tankage.

The principal objects of our invention comprise producing a method, whereby a far greater proportion of the grease or lard may be recovered than is at present possible with present methods; whereby the operation is rendered automatic and continuous and in which a minimum of skill and attendance is required in operation.

In the present practice of recovering grease or lard from tank water and tankage the grease or lard is drawn by a skilled operator from the surface of the tank water in the rendering tank and the operation is immediately terminated upon the first appearance of water from the draw off point. This method results in leaving a greater or less amount of pure lard on the surface of the tank water depending upon the skill of the operator. A careful operator will sometimes leave only 200 lbs. of grease or lard whereas very little poor judgment on the part of the operator frequently results in leaving as much as 600 lbs. of grease or lard floating on the tank water in the rendering tank. The previously rendered and supposedly grease or lard free tankage is then dumped into the refuse box and this layer of grease or lard on the tank water rushes down through and mixes with the tankage. By careful skimming, reheating and pressing, a portion of this grease or lard is finally recovered. The balance which is frequently a considerable percentage is left in the tankage and is thus a dead loss to the packer. It is to minimize this loss that our method is especially directed.

We accomplish these above noted and other very desirable features that will hereinafter be disclosed by a novel method of drawing simultaneously, from the rendering tank, grease or lard and tank water and thereafter causing or constraining the mixed grease or lard and tank water to form two hydrostatically balanced columns wherein owing to the difference in the specific gravity of the grease or lard and tank water the grease or lard level is higher than the tank water level and thereafter drawing off grease or lard from its level in one of the columns and tank water from its level in the other column.

In the drawings which accompany and form a part of this specification we have illustrated a partially sectioned elevation of one form of arrangement apparatus which may be utilized to carry out our method.

Our improved method is independent of the form of apparatus used and possibly many devices already used for other purposes in other arts may be utilized to carry out our method. However, to more clearly disclose our method we will now proceed to first describe the apparatus illustrated in the drawing.

Referring now to the drawing, the arrangement illustrated comprises a grease or lard rendering tank 10 such as is in common use in packing plants and into which the scraps or cuttings of bone, skin and flesh are placed and thereafter cooked with steam. As is usual the lower extremity of this tank is provided with a flanged collar 21 to which is secured a gate valve 20 provided with a flanged nipple 23 under which is disposed a dump or refuse box 24, which is likewise provided with a gate valve 25 and a pipe 26 adapted to lead off the refuse to any desired point.

In addition to the usual inlets (not shown in the drawing) for the admission of the steam used in cooking the scraps we provide in the rendering tank an inlet 11 located above the highest level normally reached by the contents of the tank and adapted to admit hot water in the form of a jet or spray to the tank. We likewise provide an inlet 22 located near the lower portion of the tank through which hot water or hot water and compressed air may be admitted to the tank to wash and agitate the contents thereof, as will hereinafter be described. The draw off cock 12 is located as usual so that its opening is always above the level normally attained by the tankage in the tank. We provide a system of containers, pipe fittings and pipe, forming substantially a U tube, the arms of which are of unequal length and composed of the container 38, short pipe 46, nipple 37, T 36, pipe 33, elbow 32 and pipe 31. The pipe 31 constitutes the shorter arm of the U tube and its opening or lip is maintained at a lower level than the opening or lip of pipe 46, which with container 38 and nipple 37 constitute the longer arm of the U tube. The extremities of the pipes 46 and 31 are provided with basins 44 and 30 respectively, which are as shown secured in a liquid tight manner to their respective pipes. The basin 44 is provided with an outlet to which is attached a drain pipe 45 adapted to connect the basin with a grease or lard receiving tank 47. The basin 30 is provided with a drain pipe 29 opposite the extremity of which is maintained a funnel 27 attached to a pipe 28 through which liquid may be led to any desired point. The system of piping comprising the U tube may be drained of sediment by means of the valve 35 and the system may be connected to a sewer through the pipe 34. An inlet pipe 41 emerges from the container 38 and is fitted with an extension pipe 42 to the open extremity of which a basin 43 is attached as shown in a liquid tight manner. The open extremity of the pipe 43 is positioned within the container 38 at substantially the center thereof, and a baffle plate is maintained opposite the extremity of the pipe. The container 38 is provided with a steam coil 39 by means of which the contents of the U tube may be maintained at any desired temperature. Briefly the U tube just described constitutes a means for constraining grease or lard and water to form two hydrostatically balanced liquid columns, the levels of the liquids therein, owing to the difference in specific gravity of the liquids, being maintained at different heights.

A funnel 13 is positioned opposite the draw off cock 12 and is connected through pipe 14, valve 17, fitting 15 and pipe 19 with the basin 43 on the inlet pipe 42. Likewise the lower portion of the rendering tank 10 is connected through pipe 18, valve 16, fitting 15 and pipe 19 with the inlet basin 43. It will be noted that the system of piping constituting the U tube is located at a level lower than the lower portion of the rendering tank 10 in order that the liquids may be led from the tank 10 to the U tube.

In carrying out our method we prefer, after the grease or lard has been rendered from the scraps in the rendering tank, and after the contents of the material in the rendering tank are disposed substantially as indicated by the dotted lines, in which line A—A indicates the top surface or level of the grease or lard. B—B indicates the level of the emulsion or mixed grease or lard and water, C—C indicates the level of the tank water and D—D indicates the level of the tankage, to first draw off mixed grease or lard and tank water from the draw off cock 12 until no more grease or lard appears from the draw off cock, maintaining, during the drawing off of the grease or lard the height of the tank water level with the lower portion of the draw off cock 12 as indicated by the line C—C by means of adding hot water through the inlet pipe 11 in the form of a jet or spray. The mixed grease or lard and the tank water is led through the pipes 14 and 19, the valve 17 being open and the valve 16 being closed, and is fed to container 38 of the U tube through inlet pipe 41. The mixed grease or lard and tank water impinges upon the baffle plate 40 and a partial separation of the grease or lard from the tank water occurs here. If the U tube is preliminarily filled with water to the level indicated by the dotted line shown on the drawing a column of grease or lard will build up in container 38 and pipe 46 while a column of pure tank water will build up in column 31 and owing to the lighter specific gravity of the column of grease or lard a shorter column of water in the pipe 31 will balance a higher column of grease or lard floating on a column of water in container 38 and pipe 46 and the grease or lard will therefore overflow into the basin 44 while tank water will overflow from pipe 31 into basin 30. The grease or lard may be then led to the receiving tank 47 while the tank water may be led through pipe 28 to any desired point, and a complete separation of the grease or lard from the tank water may thus be made. After the surface of the tank water is thus skimmed free of grease or lard, a jet or spray of hot water or a jet or spray of hot water and compressed air is introduced into the rendering tank 10 through the inlet 22 to thoroughly agitate and wash the tankage to free the tankage of any particles of grease or lard which may adhere thereto. After the tankage is thus washed free of grease or lard valve 16 is opened and the mixed grease or lard and tank water is trained from the rendering tank to the U tube where as hereinbefore described the grease or lard is separated from the tank water and the grease or lard is recovered in tank 47 while the tank water is led to any desired point through pipe 28. The temperature of the U tube is maintained high enough, by means of the steam coil 39 to keep the grease or lard in a fluid state, that the difference in specific gravity of the grease or lard and tank water may act to cause a complete separation between the grease or lard and the tank water.

It will be noted from the foregoing that in contradistinction to present practice our improved method contemplates drawing mixed grease or lard and tank water from a point above the tankage in the rendering tank, whereas in present methods skilled operators are employed to attempt to draw only grease or lard from a point above the tankage and the process of drawing off is terminated immediately upon the appearance of any tank water in the grease or lard.

It will be further noted that in our improved method substantially all of the grease or lard is recovered before the tankage is expelled from the rendering tank to the dump box, thus making considerable saving not only in the percentage of grease or lard recovered but also in eliminating the subsequent labor incident to recovering lard from the tankage after it is expelled from the rendering tank.

It should further be obvious that, as our process is automatic and continuous a minimum of skill and attention on the part of the operator is required.

Having thus completely described and disclosed our invention what we claim as new and desire to secure by United States Letters Patent is as follows:

1. The method of recovering lard from tank water and tankage which comprises, initially drawing mixed lard and tank water from the rendering tank at a point substantially at the line of separation of the lard and tank water therein, adding hot water to the rendering tank to maintain the line of separation on a level with the lower portion of the draw off aperture, constraining the lard and tank water so drawn off to form two hydrostatically balanced liquid columns of variant height, drawing lard from the level of the higher of said columns and drawing tank water from the lower of said columns, washing the tankage in the rendering tank with hot water, drawing mixed lard and tank water from a point near the bottom of the rendering tank and constraining the lard and tank water so drawn to form two hydrostatically balanced liquid columns of variant height and finally drawing lard from the higher of said columns and tank water from the lower of said columns.

2. The method of recovering grease from tank water and tankage which comprises, initially drawing mixed grease and tank water from the rendering tank at a point substantially at the line of separation of the grease and tank water therein, adding hot water to the rendering tank to maintain the line of separation on a level with the lower portion of the draw off aperture, constraining the grease and tank water so drawn off to form two hydrostatically balanced liquid columns of variant height, drawing grease from the level of the higher of said columns and drawing tank water from the lower of said columns, washing the tankage in the rendering tank with hot water, drawing mixed grease and tank water from a point near the bottom of the rendering tank and constraining the grease and tank water so drawn to form two hydrostatically balanced liquid columns of variant height and finally drawing grease from the higher of said columns and tank water from the lower of said columns.

Signed by us at Toronto, county of York, and Province of Ontario, in the presence of two witnesses.

JOHN BANNON.
FREDERICK W. THOROLD.

Witnesses:
CHAS BAMFORTH,
H. L. VANCOE.